March 24, 1959     O. C. ENIKEIEFF     2,879,316
BATTERY HOLDER
Filed March 14, 1958

INVENTOR
Oleg C. Enikeieff

BY Mason, Fenwick & Lawrence
ATTORNEYS

United States Patent Office 2,879,316
Patented Mar. 24, 1959

2,879,316

BATTERY HOLDER

Oleg C. Enikeieff, Silver Spring, Md., assignor to Harry C. Miller Company, Rochester, N.Y., a partnership Application March 14, 1958, Serial No. 721,416

4 Claims. (Cl. 136—173)

The present invention relates in general to battery holders or cases, and more particularly to battery holders designed to receive various combinations of cylindrical batteries such as mercury cells and the like.

Heretofore, battery holders have been provided for dry cell batteries of standardized cylindrical shape and size. These battery holders generally comprised a pair or several pairs of arcuate prongs of resilient sheet metal arranged in laterally spaced aligned relation conforming to a major portion of the cylindrical surface of a standard dry cell battery and spaced apart at their free ends to permit the cell to be forced therebetween, together with upper and lower contact arms which were usually formed of flat sheet metal strips or sometimes leaf springs, for contacting the base of the dry cell cup or shell and the electrode cap at the opposite ends of the cell. These battery holders in many cases did not maintain good electrical contact over long periods of use and the prongs frequently tore the insulation covering the sides of the dry cell. Also, such battery holders were dimensioned for a single dry cell of standard size and, therefore, were not adaptable to receive a plurality of cells in different combinations to provide a wide selection of voltages.

An object of the present invention is the provision of a novel battery holder which facilitates the use of different combinations of mercury cells to provide a wide selection of voltages.

Another object of the present invention is the provision of a novel battery holder for mercury cells and like cylindrical battery units, which completely encases the cells to protect the cells and the associated circuitry and which are constructed in such a way as to prevent tearing of the insulation covering on the cells.

Another object of the present invention is the provision of a novel battery holder for different combinations of mercury cells and like battery units, which facilitates mounting of the cells on an electrical apparatus chassis and the connection of the same with the electrical components to be supplied thereby.

Another object of the present invention is the provision of a novel battery holder for different combinations of mercury cells and like battery units which facilitates insertion of the battery group into a casing for portable electrical devices and removal of the battery group therefrom.

Other objects, advantages and capabilities of the present invention will become apparent from the following detail description taken in conjunction with the accompanying drawing illustrating one preferred embodiment of the invention.

Figure 1:
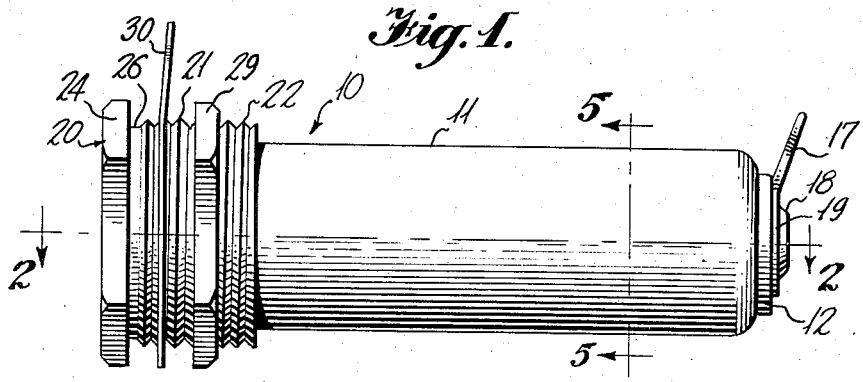
Figure 1 is a side elevation of a battery holder embodying the present invention.
Figure 2:
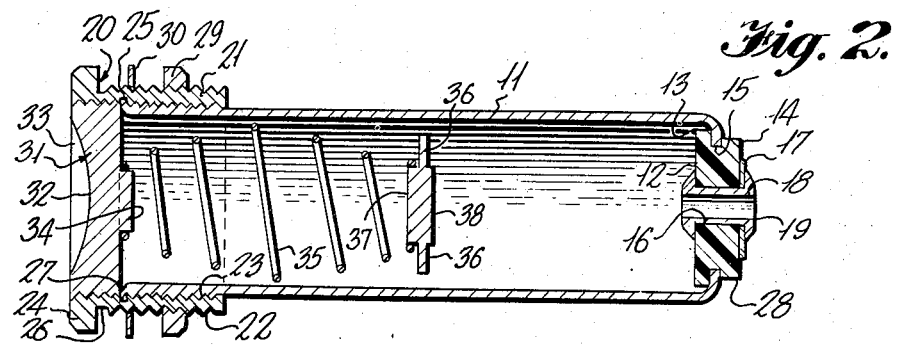
Figure 2 is a longitudinal horizontal section taken along the line 2—2 of Figure 1.
Figure 3:
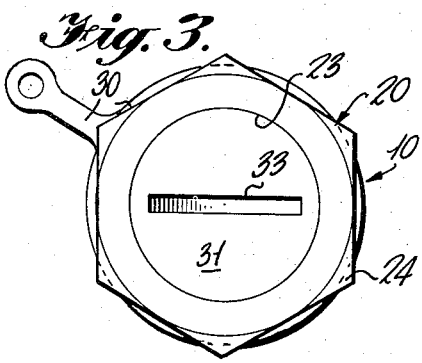
Figure 3 is an end elevation of the battery holder viewed from the left in Figure 1.
Figure 4:
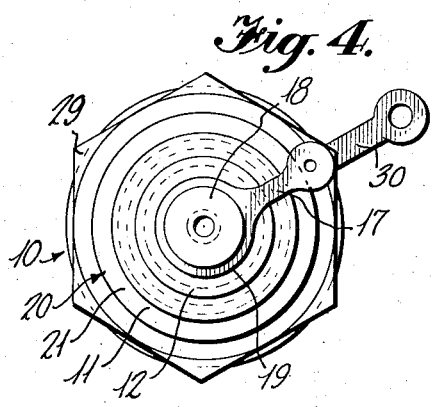
Figure 4 is an end elevation of the battery holder viewed from the right in Figure 1.
Figure 5:
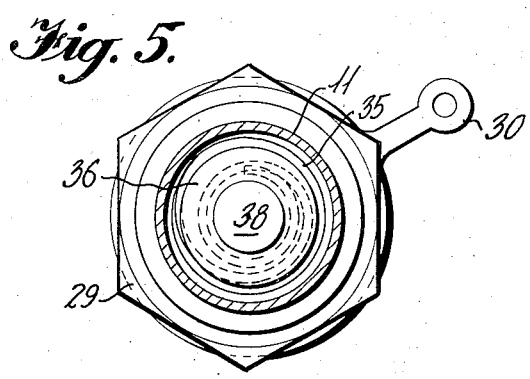
Figure 5 is a transverse section taken along the line 5—5 of Figure 1.

Referring to the drawing wherein like reference characters designate corresponding parts throughout the several figures, the battery holder of the present invention, indicated generally by the reference character 10, includes a shell or case 11 formed of seamless, drawn aluminum tubing which is cut into tube sections of desired lengths. In one preferred example, the shell 11 is formed of seamless aluminum tubing having an outer diameter of .715 inch, a wall thickness of .015 inch and a length of 2.4 inches. In another preferred form, the shell 11 is formed of the same aluminum tubing cut to sections which are 3.025 inches long.

The bottom of the shell is closed by a hard fiber washer 12 having a large diameter annular lip 13 at the inner end thereof, and a smaller diameter annular lip 14 at the outer end thereof spaced from the lip 13 to provide an annular groove 15. The washer 12 also has a circular hole 16 bored through its center. In the preferred example, this hard fiber washer is cut from 5/8 inch diameter hard fiber rod to provide a washer having a thickness of approximately 5/8 inch, the larger lip 13 having an outer diameter of .125 inch, the smaller lip 14 having an outer diameter of 9/16 inch and the base of the annular groove 15 having a diameter of 1/2 inch and a width of .040 inch. In this example, the larger lip 13 has a width of .042 inch and the central hole 16 of a .128 inch diameter. A soldering lug 17 of conventional construction, is assembled to the outer or exposed end of the washer 12 by means of a rivet or eyelet 18 which projects through an apertured end portion 19 of the soldering lug 17. In the preferred example, the soldering lug 17 is a No. 6 soldering lug of flat sheet metal approximately 5/8 inch long.

A head member or mounting cap 20 is provided at the upper end of the shell 11 and includes a tubular body portion 21 having external threads 22 and internal threads 23 and a hexagonal flange 24. The internal threads 23 in the tubular body portion 21 are interrupted by an annular groove 25 and an undercut groove 26 is preferably provided on the external surface of the body portion 21 adjoining the base of the hexagonal flange 24. The head 20 is made on a screw machine which forms threads entirely through the tubular body portion 21 and the groove 25 is then cut into the internal threads 23. In the preferred embodiment, the head is formed from one inch hexagonal aluminum rod. It is drilled to provide a bore of .714 inch diameter after tapping and the body portion 21 has an outer diameter of .870 inch after threading and is approximately 1/2 inch long. The groove 25 in the preferred example is .030 inch wide and cut to a diameter of .745 inch, and the undercut groove 26 is .050 inch wide and cut to a diameter of .806 inch.

After the washer 12, soldering lug 17 and rivet 18 are sub-assembled in the conventional manner, assembly of the head 20, washer 12 and shell 11 is achieved in a simple manner by placing the sub-assembly unit including the washer 12, head 20 and the plane piece of tubing forming the shell 11 cut to desired length, in a suitable fixture with one end of the shell 11 substantially aligned with the groove 25 and the other end substantially aligned with the groove 15, and applying pressure to the opposite ends of the tubing to flare or roll the ends into the grooves 25 and 15, the flared lips at the ends of the shell 11 being indicated at 27 and 28. It will be understood that this may be achieved by suitably shaped mandrels which guide the edges of the tubular shell 11 into the adjacent grooves 25 and 15 upon application of approaching pressure to the opposite ends of the shell.

If the chassis for the electrical device with which the battery holder to be associated is electrically conductive, the battery holder may be mounted in a simple manner by drilling in the chassis a hole of slightly larger diameter than the maximum diameter of the external threads 22, inserting the end of the shell 11 carrying the washer 12 through the opening and projecting the battery holder through the chassis hole until the hexagonal flange 24 bears against the chassis surface. A threaded hexagonal nut 29 may then be threaded onto the external threads 22 to lock the battery holder in position on the chassis and the head 20 then becomes electrically grounded to the chassis. If the chassis is insulated, the external threads 22 are long enough to accommodate a soldering lug or terminal washer 30 of the type having an opening large enough to receive the tubular body portion 21, and then the hexagonal nut 29 may be threaded onto the external threads 22 to lock the battery holder in position on the chassis. In this case, the soldering lug 30 then becomes the ground terminal.

A closure plug 31 is provided having a disk-like body 32 provided with a slot or key-way 33 in its exposed surface and threaded along its periphery to be threadedly coupled with the internal threads 23 in the bore of the tubular body portion 21 of the head 20. A generally cylindrical neck 34 projects from the inner surface of the plug 21 and is provided with a concavely cut periphery to retain one end of a coil spring 35 thereon. A disk-like contact member 36 is supported on the opposite end of the spring 35 and includes a similarly formed neck 37 having a concavely cut periphery to retain the other end of the spring 35 thereon. The opposite surface of the contact member 36 has a cylindrical boss 38 adapted to project into contact with the appropriate terminal of a mercury cell.

In the use of the battery holder 10, the plug 31 may be removed from the holder by inserting a coin or blade into the slot 33 and rotating the plug in a direction to thread the same out of the head 20. Withdrawal of the plug 31 also withdraws the spring 35 and contact member 36 supported thereby. Cylindrical mercury cells in any of a variety of combinations to produce a wide selection of voltages may be then inserted into the cell 11. One contact of the lowermost mercury cell within the cell 11 abuts the rivet 18, which is of conductive material, to place the soldering lug 17 in electrical contact with this terminal of the lowermost cell. The plug 31 is then threaded into the bore of the head 20 to close the battery holder. The spring 35 maintains constant pressure upon the uppermost mercury cell to project the lowermost cell into intimate contact with the rivet 18 and maintains the contact member 36 in intimate electrical contact with the other terminal of the uppermost cell within the cell 11. Due to the resilient support of the upper contact member 36, good electrical contact is maintained even though only a few mercury cells occupying only a small portion of the cell 11 are used. This battery holder, therefore, is particularly useful in connection with transistorized circuits as a voltage source for the transistors as it permits a selection of commercially available mercury cells in different combinations to be used to provide an appropriate voltage source for a transistor stage or stages without requiring a voltage divider. Since the space occupied by such battery holders is small, a plurality of such units may be employed in portable devices to provide appropriate voltage supplies for different stages. Since the mercury cells are completely encased, the electrical circuitry is well protected against corrosion and the cells are protected against adverse external influences.

While a practical embodiment of the invention has been disclosed in the above description, it will be understood by those skilled in the art that other re-arrangements of the parts cooperable to carry out the inventive concept may be made and are to be regarded as within the purview of the invention.

I claim:

1. A holder for retaining a plurality of cylindrical battery cells of the mercury cell type and the like in various combinations comprising a hollow cylindrical receptacle of a length to accommodate a plurality of axially aligned cylindrical battery cells therein in end-to-end relation including an elongated tubular shell having an open end, a bottom for said shell forming a base end for the receptacle having an electrical contact member disposed in alignment with the central axis of the shell and insulated from the shell for contacting one of the terminals of the lowermost cell housed therein, externally exposed terminal means in electrical communication with said contact member for coupling an electrical circuit therewith, an annular head member surrounding and affixed to said shell at the open end thereof having a bore bounding said open end of the shell and forming an entrance opening to the shell, said head member having an outwardly projecting annular flange forming an annular mounting shoulder for the holder for locating the same on an apertured supporting panel, a threaded nut threadedly coupled on said head cooperating with said mounting shoulder to removably support said holder on the apertured panel, a cylindrical plug removably seated in said bore in said head to close the open end of said shell, an electrically conductive contact elements for contacting one of terminals of the uppermost cell in said shell, and resilient means affixed at one end to said plug member and at the other end to said contact element for supporting said contact element within said shell in spaced relation to said plug member in electrically conductive communication therewith and continuously urging the same toward said contact member.

2. A holder for retaining a plurality of cylindrical battery cells of the mercury cell type and the like in various combinations and adapted to be removably supported on an apertured supporting panel or the like with the major portion of the holder projecting through an aperture in the supporting panel, comprising a hollow cylindrical receptacle of a length to accommodate a plurality of axially aligned cylindrical battery cells therein in end-to-end relation including an elongated tubular shell having an open end, a bottom for said shell forming a base end for the receptacle having an electrical contact member disposed in alignment with the central axis of the shell and insulated from the shell for contacting one of the terminals of the lowermost cell housed therein, externally exposed terminal means in electrical communication with said contact member for coupling an electrical circuit therewith, an annular head member surrounding and affixed to said shell at the open end thereof having an internally threaded bore bounding said open end of said shell and forming an entrance opening to the shell, said head member having an outwardly projecting annular flange forming an annular mounting shoulder for the holder and a constricted portion of smaller diameter than the periphery of said flange extending from said flange toward the base end of said receptacle, said shell and said constricted portion of said head member being adapted to be projected through an aperture in the supporting panel substantially complementing the cross section of said constricted portion, a threaded nut threadedly coupled on said constricted portion of said head cooperating with the mounting shoulder to removably support said holder on the apertured panel, a peripherally threaded cylindrical plug removably seated in said internally threaded bore in said head to close the open end of said shell, an electrically conductive contact disk for contacting one of the terminals of the uppermost cell in said shell, and a coil spring affixed at one end to said plug member and at the other end to said contact disk for supporting said contact disk within said shell in spaced relation to said plug member in electrically conductive communication therewith and continuously urging the same toward said contact member.

3. A battery holder for housing a plurality of cylindrical battery cells of the mercury cell type and adapted to be removably supported on an apertured supporting panel or the like with the major portion of the holder projecting through an aperture in the supporting panel, comprising an elongated, cylindrical tube for accommodating a plurality of axially aligned cylindrical battery cells therein in end-to-end relation having a base end and an entrance end, a disk of insulating material forming a closure for said base end having an electrically conductive contact member extending therethrough in alignment with the axis of said tube including an inwardly exposed portion disposed to contact one terminal of the lowermost battery cell in said tube and an externally exposed terminal lug in electrical communication therewith, means for rigidly affixing said disk to said tube, an annular head member having an internally threaded bore lapping a portion of said tube adjacent the entrance end thereof and projecting beyond said entrance end, means securing said head member to said tube, said head member having a radially outwardly projecting flange and an externally threaded cylindrical surface of smaller diameter than the periphery of said flange extending from said flange toward the base end of said tube, said tube and the smaller diameter portion of said head member being adapted to be projected through an aperture of a supporting panel corresponding substantially to the cross section of said smaller diameter surface, a nut threaded onto said externally threaded cylindrical surface cooperating with said flange adapted to abut opposite surfaces of the supporting panel bounding said aperture therein, a cylindrical plug having a threaded periphery removably threaded into the bore of said head member, said head member and said plug being of electrically conductive material in electrical communication with each other, an electrically conductive contact disk for engaging one of the contacts of the uppermost battery cell in said tube, and a coil spring of electrically conductive material supported at one end of said plug and connected at the other end to said contact disk for supporting said contact disk within said tube in spaced relation with said plug and for resiliently biasing said contact disk toward the base end of said tube into contact with the adjacent surface of the nearest battery cell within the tube over a selected range of distances corresponding to the spacing of the adjacent battery cell surface from the plug for various combinations of cells producing a selected range of voltages.

4. A battery holder for a plurality of cylindrical battery cells of the mercury cell type and adapted to be removably supported on an apertured supporting panel or the like with the major portion of the holder projecting through an aperture in the supporting panel, comprising an elongated cylindrical tube having a base end and an entrance end, a fiber disk of insulating material forming a closure for said base end having an outwardly opening annular groove in the periphery thereof and an electrically conductive contact member extending therethrough in alignment with the axis of said tube including an inwardly exposed portion disposed to contact one terminal of the lowermost battery cell in said tube and an externally exposed terminal lug in electrical communication therewith, said tube having an inwardly flaring, uninterrupted lip projecting into said annular groove on the periphery of said fiber disk for rigidly affixing said fiber disk to said tube, an annular head member having an internally threaded bore lapping a portion of said tube adjacent the entrance end thereof and projecting beyond said entrance end, an annular groove in the internal threaded surface intermediate the ends of the head member, said tube having an outwardly flaring lip at the entrance end thereof projected into tightly fitted relation within said groove, said head having a radially outwardly projecting flange and an externally threaded cylindrical surface, a nut threaded onto said externally threaded cylindrical surface cooperating with said flange to clamp opposite surfaces of a supporting panel therebetween, a cylindrical plug having a theraded periphery removably threaded into the internally threaded bore of said head member, said head member and said plug being of electrically conductive material in electrical communication with each other, an electrically conductive contact disk for engaging one of the contacts of the uppermost battery cell in said tube, and a coil spring of electrically conductive material supported at one end of said plug and connected at the other end to said contact disk for supporting said contact disk within said tube in spaced relation with said plug and resiliently biasing said contact disk toward the base end of said tube.

References Cited in the file of this patent

UNITED STATES PATENTS

| | | |
|---|---|---|
| 1,264,520 | Holmes | Apr. 30, 1918 |
| 1,497,786 | Hoge | June 17, 1924 |
| 2,007,203 | Kraeft | July 9, 1935 |